United States Patent Office 3,240,585
Patented Mar. 15, 1966

3,240,585
EMULSIFIABLE AGRICULTURAL BIOCIDE
COMPOSITION
Andrew Stefcik, Easton, Pa., and Fred E. Woodward, Plainfield, N.J., assignors to General Aniline & Film Corporation, New York, N.Y., a corporation of Delaware
No Drawing. Filed June 26, 1962, Ser. No. 205,216
13 Claims. (Cl. 71—2.6)

This invention relates broadly to emulsifiable compositions and more particularly to emulsifiable compositions comprising a biocide, an organic solvent and an emulsifier, which are particularly adapted to be employed as agricultural sprays.

The use of biocides or toxicants including insecticides, fungicides, weed killers, insect repellents, rodenticides, nematocides, etc., is wide-spread in the agricultural industry and the biocide is commonly applied by dispersing an emulsion comprising the biocide, an organic solvent therefor and an emulsifier in water and spraying the resulting composition on the subject which is desired to be treated.

The agricultural sprays heretofore employed, although suitable in many respects, suffered from some disadvantages including poor stability over prolonged periods of time as well as the formation of sludge arising from contaminants in the system. These disadvantages of the prior art agricultural sprays stem from the particular emulsifier which was added to the biocide and the organic solvent. Additionally, the agricultural sprays heretofore formulated required the use of many emulsifiers for the various biocides employed. This was due to the fact that many of the toxicant or biocide materials are sensitive to either alkaline or acid and an emulsifier had to be chosen which would tend to reduce the decomposition of the biocide.

Therefore, it is the primary object of this invention to provide emulsifiable compositions particularly adapted to be employed as agricultural sprays, said emulsifiable compositions being characterized by ease of formation, excellent stability over prolonged periods of time and substantially free from sludge formation.

It is another object of this invention to provide emulsifiable compositions of a wide spectrum of biocides all employing the same class of emulsifiers.

Other objects will become apparent from the following description of the instant invention.

It has now been found that the above objects can be attained by employing certain phosphate esters as emulsifiers for compositions comprising at least one biocide and at least one organic solvent. It is to be immediately understood that the instant invention resides in the incorporation of certain phosphate esters as emulsifiers in emulsifiable compositions, said emulsifiable compositions being well known in the art. This invention is not dependent on the particular biocide or mixture of biocides employed or the organic solvent or mixture of organic solvents used to dissolve the biocide.

The phosphoric esters which are employed as emulsifiers in the emulsifiable compositions of the instant invention can broadly be defined as the reaction product of one mol of $P_2O_5$ with from 2.0 to 4.5 mols of a non-ionic surface active agent having the molecular configuration of a condensation product of at least one mol of ethylene oxide with one mol of a compound containing at least 6 carbon atoms and a reactive hydrogen atom under substantially anhydrous conditions and at a temperature below 110° C.

The non-ionic surface active agents employed are well known in the art and are disclosed along with suitable methods for their preparation in numerous patents and other publications. In general, they may be obtained by condensing a polyglycol ether containing the required number of alkenoxy groups or an alkylene oxide such as propylene oxide, butylene oxide, or preferably ethylene oxide, with an organic compound containing a reactive hydrogen atom. As such compounds containing a reactive hydrogen atom, there may be mentioned alcohols, phenols, thiols, primary and secondary amines, and carboxylic and sulfonic acids and their amides. The amount of alkylene oxide or equivalent condensed with the reactive hydrogen-containing compound, i.e., the length of the polyoxyalkylene chain, will depend primarily upon the particular compound with which it is condensed. As a convenient rule of thumb, an amount of alkylene oxide or equivalent should be employed which will result in a condensation product containing about 20 to 85% by weight of combined alkylene oxide. However, the optimum amount of alkylene oxide for attainment of the desired hydrophobic-hydrophilic balance may be readily determined in any particular case by preliminary test and routine experimentation.

A preferred group of nonionic surface active agents are those derived from alkyl phenolic compounds. Numerous compounds of this type, i.e., polyalkylene oxide derivatives of phenolic compounds containing one or more alkyl substituents are described in U.S. Patents 2,213,477 and 2,593,112. Those preferred are the polyalkylene oxide derivatives of alkyl phenolic compounds in which the total number of alkyl carbon atoms is between 4 and 20. As examples of such phenolic compounds may be mentioned normal and isomeric butyl, amyl, dibutyl, and diamyl phenols and cresols, tripropyl phenols and cresols, heptyl, octyl, nonyl, decyl, undecyl, dodecyl, tetradecyl, cetyl, oleyl, octadecyl and the like, phenols and cresols in addition to dihexyl- and trihexyl-phenol prepared from hexene-1 and phenol, diisoheptyl-phenol, dioctyl-phenol, dinonyl-phenol, dioctyl-p-cresol, didodecyl-phenol, and the like. Of particular value are the polyalkylene oxide derivatives of secondary and tertiary alkyl substituted phenols and cresols obtained by condensing olefins of the type obtained in petroleum refining with phenols or cresols. In the case of products obtained by condensing phenol or cresol with olefins of from 3 to 5 carbon atoms such as propylene, butylene or amylene, it is sometimes desirable to employ the dialkylated phenols or cresols, while in the case of compounds obtained by condensing a phenol or cresol with an olefin containing 8 or more carbon atoms, the mono-substituted derivatives are sometimes preferred. Particularly desirable derivatives can be obtained from the phenols and cresols containing a substituent derived from olefins containing from 8 to 18 carbon atoms, such as diisobutylene and other alkylenes as nonylene, decylene, undecylene, dodecylene, pentadecylene, octadecylene and mixtures thereof, and may advantageously be the dimers and trimers obtained by polymerization of such low molecular weight olefins as propylene, butylene, isobutylene, amylene or mixtures thereof.

However, the polyalkylene oxide derivatives of other organic compounds containing an active hydrogen may be employed as reactants in the present invention. Thus, the polyalkylene oxide derivatives, described in U.S. Patent 1,970,578, of aliphatic organic hydroxy compounds, may be employed if desired. As examples of water-insoluble higher fatty acids whose polyalkylene oxide derivatives may be employed may be mentioned lauric, oleic, ricinoleic, palmitic and stearic acid, and the like or mixtures thereof, such as the mixtures obtained from animal and vegetable fats and oils or by the oxidation of such petroleum fractions as paraffin wax. As another preferred group, there may also be employed polyalkylene oxide derivatives of water-insoluble aliphatic hydroxy compounds such as higher aliphatic alcohols of at least 10 carbon atoms, i.e., the alcohols corresponding to the fatty acids specified immediately above, particularly the alcohols obtainable by hydrogenation of the fatty acids or glycerides present in animal or vegetable oils and waxes such as coconut oil, castor oil, and the like, as well as the polyalkylene oxide derivatives of the animal and vegetable oils, fats and waxes themselves. There may also be used polyalkylene oxide derivatives of organic mercapto compounds such as the products described in U.S. Patent 2,205,021, i.e., the polyalkylene oxide derivatives of such mercapto compounds as dodecyl mercaptan, oleyl mercaptan, cetyl mercaptan, decyl mercaptan and thiophenols, thionaphthols, benzo-mercaptan, etc.; also the polyalkylene oxide derivatives of carboxylic acid amines such as those described in U.S. Patent 2,085,706, and of sulfonamides of the type described in U.S. Patent 2,002,613, or the polyalkylene oxide derivatives, described in U.S. Patent 2,266,141, or sulfonic acids may be employed if desired. Similarly, the surface active polyalkylene oxide derivatives disclosed in U.S. Patent 2,677,700 may also be employed in the instant invention.

Another group of nonionic surface active agents which may be employed are those of the Pluronic type as disclosed for example in U.S. Patent 2,674,619 and other patents. In general, in preparing these agents a suitable 1,2-alkylene oxide or substituted alkylene oxide, as for example butylene oxide, amylene oxide, phenyl ethylene oxide (oxystyrene), cyclohexene oxide, cyclooctene oxide, or preferably propylene oxide, or a mixture thereof, is polymerized in the presence of an alkaline catalyst such as sodium hydroxide, preferably at elevated temperatures and pressures to produce the corresponding water-insoluble polypropylene glycol or substituted polypropylene glycol having a molecular weight of about 300 to 3000. Said polyglycol is then reacted under similar conditions with the required number of moles of ethylene oxide to yield the desired nonionic surface active agents employed herein. These agents should generally have a molecular weight ranging from about 1200 to 15,000 and preferably about 2000 to 10,000. Alternatively, ethylene diamine propylene diamine, and other alkylene diamines and polyalkylene polyamines, in addition to ethylene glycol, propylene glycol, 1,4-butanediol, hexamethylene glycol and other diols may be reacted with the required number of moles of propylene oxide or substituted propylene oxide to produce the corresponding water-insoluble polypropylene glycols and substituted polypropylene glycols having a molecular weight of about 300 to 3000 as described above, followed by reaction with the required number of moles of ethylene oxide. It will be understood that these Pluronic types of nonionic surface active agents will ordinarily be of the diol type containing two terminal hydroxy (ethanol) groups. One of these terminal hydroxy groups may be blocked by reaction with an etherifying agent, esterifying agent, or the like prior to phosphation in accordance with the process of this invention. However, if not so blocked or protected, it may in some instances be advisable to increase the proportion of this nonionic surface active agent employed in the present phosphation reaction to up to double the proportions referred to above. Whether blocked or unblocked, these agents will generally produce a more complex mixture of reaction products due to a tendency towards chaining, cross-linking, and/or ring closing, and the like.

Another preferred group of nonionic surface active agents are the condensation products of at least one mol of ethylene oxide with one mol of a multi-branched chain primary aliphatic alcohol having the molecular configuration of an alcohol produced by the Oxo process from a polyolefin of at least 7 carbon atoms. Such alcohols are prepared by the catalytic reaction of a polyolefin such as tripropylene, tetrapropylene, pentapropylene, diisobutylene triisobutylene, tetraisobutylene, propyleneisobutylene and tributene and the like with carbon monoxide and hydrogen to form an aldehyde followed by catalytic reduction of this aldehyde to a primary alcohol. This two-stage process is well known as the Oxo process and alcohols produced by such process may be designated as Oxo alcohols. A particularly preferred alcohol of this type is the Oxo tridecyl alcohol produced from tetrapropylene or triisobutylene. These alcohols are reacted with the required number of mols of ethylene oxide to produce nonionic surface active agents effective as reactants herein.

The following is an illustrative, non-limitative list of some specific examples of suitable nonionic surface active agents which may be employed. In this list, "E.O." means "ethylene oxide" and the number preceding same refers to the number of mols thereof reacted with one mol of the given reactive hydrogen-containing compound.

Nonyl+9–11 E.O.
Nonylphenol+2 E.O.
Dinonylphenol+7 E.O.
Dodecylphenol+18 E.O.
Castor oil+20 E.O.
Tall oil+18 E.O.
Oleyl alcohol+20 E.O.
Lauryl alcohol+4 E.O.
Lauryl alcohol+15 E.O.
Hexadecyl alcohol+12 E.O.
Hexadecyl alcohol+20 E.O.
Octadecyl alcohol+20 E.O.
Oxo tridecyl alcohol (from tetrapropylene)+7 E.O.
Oxo tridecyl alcohol (from tetrapropylene)+10 E.O.
Oxo tridecyl alcohol (from tetrapropylene)+15 E.O.
Dodecyl mercaptan+9 E.O.
Soya bean oil amine+10 E.O.
Resin amine+32 E.O.
Coconut fatty acid amine+7 E.O.
Coco fatty acid+10 E.O.
Dodecylbenzene sulfonamide+10 E.O.
Decyl sulfonamide+6 E.O.
Oleic acid+5 E.O.
Polypropylene glycol+10 E.O.

In carrying out the phosphation reaction, the $P_2O_5$ is preferably added gradually, with vigorous agitation, to the nonionic surface active agent in liquid form. If the latter agent is a solid at room temperature, it should be heated to above its melting point. Addition of the nonionic surface active agent to the $P_2O_5$ is inadvisable since this has been found to result in the formation of tar and the like and to prevent the reaction from proceeding to completion. The reaction is exothermic and in some cases cooling is necessary to prevent the temperature from going above about 110° C., since this tends to produce discolored and darkened products. The reaction proceeds continuously during addition of the $P_2O_5$ and solution thereof in the nonionic surface active agent, and is substantially 90% complete or more by the time all of the $P_2O_5$ has been added. The few particles of solid $P_2O_5$ remaining in the reaction medium may be removed at this point if time is of the essence, but it is preferred in the interests of economy to allow the reaction to proceed for an additional period of time which may range from ½ to 5 hours or more at ambient temperatures up to about 110° C. until all of the $P_2O_5$ has dissolved indicating complete reaction between the reactants involved. Vigorous agitation during the reaction is highly desirable to facilitate and expedite completion of the reaction.

It is an advantageous feature that the $P_2O_5$ may be employed in dry, solid form as a granular powder or other finely divided or particulate form, for reaction with the above-defined nonionic surface active agents. However, if desired, the $P_2O_5$ may first be dispersed in an inert organic diluent such as benzene, xylene, ether, pentane, or low and high boiling hydrocarbon fractions.

After completion of the reaction, the reaction mixture may be cooled and discharged. If carried out under rigid anhydrous conditions, the product should consist of a mixture of the primary and secondary phosphate esters of the nonionic surface active agent combined, depending upon the proportions of reactants, in some instances with a small proportion of unreacted nonionic surface active agent. Any small amount of water present in the reaction mixture will result pro tanto in the formation of some phosphoric acid in the product. The degree of esterification in the product may be determined by potentiometric titration or by titration with alkali to methyl orange and then to phenolphthalein.

The phosphate esters employed may be supplied in free unneutralized form or in the form of the partially or completely esterified salts containing as cations alkali metals, alkaline earth metals, metals, ammonium and organic amines. It is to be understood that such salts are to be regarded as the equivalent of the present products in their free form. As examples of suitable cations, there may be mentioned sodium, potassium, lithium, calcium, strontium, barium, magnesium, iron, tin, cadmium, aluminum, antimony, chromium, manganese, mercury, nickel, silver, zinc, ammonium and aliphatic, alicyclic, aromatic and heterocyclic organic amines such as the mono-, di-, and tri-methylamines, ethylamine, propylamines, laurylamines, stearylamines, ethanolamines, propanolamines, butanolamines, hexanolamines, cyclohexylamines, phenylamines, pyridylamines, morpholinylamines, and the like.

As has heretofore been pointed out, this invention relates to emulsifiable compositions comprising the emulsifiers above-described, a biocide and an organic solvent. The biocides or toxicants which are applicable in the instant invention are the materials classed as insecticides, fungicides, weed killers, insect repellants, rodenticides, nematocides, etc. These compounds or compositions are generally soluble in organic solvents and are applied in highly dispersed form in aqueous suspensions or emulsions. It is to be understood that members of the above classes of biocides may be used alone or in conjunction with other materials of the same class and/or materials from other classes.

The following table will illustrate some of the biocides applicable in the instant invention without being limited thereto:

*Table I*

| Trade Name | Chemical Name |
| --- | --- |
| DDT | 2,2-bis(para-chlorophenyl)-1,1,1-trichloroethane. |
| DDD | 2,2-bis(p-chlorophenyl)-1,1-dichloroethane. |
| 2,4-D and esters | 2,4-dichlorophenoxyacetic acid. |
| 2,4,5-T and esters | 2,4,5-trichlorophenoxyacetic acid. |
| Toxaphene | Chlorinated camphene (67–69% chlorine). |
| Chlordane | 60% of 1,2,4,5,6,7,8,8-octachloro-4,7-methano-3a,4,7,7a-tetrahydroindane. |
| Dilan | ⅓ of 2-nitro-1,1-bis(p-chlorophenyl) propane and ⅔ of 2-nitro-1,1-bis-(p-chlorophenyl) butane. |
| Nicotine sulphate | 1-methyl-2-pyridyl-pyrrolidone sulphate. |
| Dieldrin | Contains 85% of 1,2,3,4,10,10-hexachloro-6,7-epoxy-1,4,4a,5,6,7,8,8a-octahydro-1,4,5,8-dimethanonaphthalene. |
| Lindane | 1,2,3,4,5,6-hexachlorocyclohexane (99% gamma isomer). |
| B.H.C. | Mixed isomers of 1,2,3,4,5,6-hexachlorocyclohexane. |
| C.P.R. | 5.1% piperonyl cyclonene, 0.51% pyrethrum, 2.55% rotenone. |
| I.P.C. | Isopropyl N-phenyl carbamate. |
| Chloro I.P.C. | Isopropyl-N-(3-chlorophenyl) carbamate. |
| Methoxychloro | 1,1,1-trichloro-2,2-bis(p-methoxyphenyl) ethane. |
| Aldrin | 95% of 1,2,3,4,10,10-hexachloro-1,4,4a,5,8,8a-hexahydro-1,4,5,8-dimethanonaphthalene. |
| Parathion | o,o-Diethyl-1-p-nitrophenylthiophosphate. |

The type of organic solvents which find utility in preparing the novel compositions of the invention are not necessarily critical in nature and any suitable solvent can be aromatic, aliphatic, cycloaliphatic or heterocyclic in nature. Generally, but not necessarily, the aromatic solvents are preferred mainly because of their ready availability and favorable costs.

Aromatic solvents which are suitable for use in accordance with the teachings and procedures of the invention are generally, but not necessarily, hydrocarbon in nature, of high aromatic content usually from 70 to 98 volume percent, and derived from petroleum. These solvents are also characterized by a high boiling range and high solvency characteristics. Representative aromatic solvents found to be useful are "Velsicol AR–50G" available from Velsicol Chemical Corporation and "Panasol AN–2K" obtainable from Amoco Chemicals Corporation. The properties of which are, respectively.

VELSICOL AR–50G
Specifications:

| | |
| --- | --- |
| A.P.I. gravity at 60° F. | 15.5–18.0. |
| Weight per gallon at 60° F. | 7.88–8.02. |
| Specific gravity at 60° F. | 0.947–0.963. |
| Color (union scale) | 1–2. |
| Flash point (C.O.C.) | 180° F. |
| Viscosity SSU at 100° F. | 30–40 seconds. |
| Mixed aniline point | 25° C. max. |
| Kauri-butanol value, mixed (toluol-105) | 80. |
| Distillation range— | |
| I.B.P. | 390° F. min. |
| 10% | 430°–450° F. |
| 50% | 460°–480° F. |
| 90% | 510°–530° F. |
| E.P. | 550° F. max. |

PANASOL AN–2K

Distillation 2F., ASTM D–158:

| | |
| --- | --- |
| I.B.P., ° F. | 398 |
| EP., ° F. | 525 |
| D.P., ° F. | ---- |
| Specific gravity, 60/60° F. | 0.950 |
| Aromatics, vol. percent | 82 |
| Mixed aniline point, ° F. | 75 |
| Flash point, C.O.C., ° F. | 200 |
| Flash point, T.C.C., ° F. | ---- |

The relative amounts of biocide, organic solvent and emulsifier in the novel compositions of this invention are not narrowly critical and can vary over a wide range. Generally speaking however, it has been found that excellent compositions are obtained when from 10–70 percent by weight of biocides, 2–6 percent by weight of emulsifier and 28–88 percent by weight of organic solvent are employed.

As has heretofore been pointed out, the emulsifiable compositions of this invention are applied by dispersing them in water. The amount of emulsifiable composition dispersed in water is not narrowly critical and obviously dependent upon the particular biocide employed and the particular object desired to be treated. However, it has been found that excellent results are obtained when from 1.5–30 parts by weight of the emulsifiable compositions of this invention are dispersed in 98.5–70 parts by weight of water.

The following examples will illustrate the novel compositions of this invention but it is not intended that it be limited thereto.

*Example 1*

An emulsifiable composition was prepared by combining:

25 parts by weight of DDT,
3 parts by weight of a phosphate ester prepared by reacting nonylphenol with 6 mols of ethylene oxide to obtain a surface active agent and then reacting 2.7 mols of said surface active agent with 1 mol of phosphorus pentoxide, and
72 parts of an aromatic hydrocarbon (Velsicol AR–50G sold by the Velsicol Chemical Co.).

Two emulsions were then prepared from the above composition, each emulsion containing 80 percent by weight of water. In one emulsion the water employed had a hardness of 65 p.p.m. and in the other, the water employed had a hardness of 342 p.p.m.

The resulting emulsions were of excellent quality and possessed a high degree of stability indicating the effectiveness of the phosphate ester emulsifier.

*Example 2*

An emulsifiable composition was prepared by combining:

46 parts of chlordane,
50 parts of kerosene, and
4 parts of the emulsifier employed in Example 1.

Two emulsions were again prepared from the above composition employing 95 percent by weight of water. In one emulsion, water having a hardness of 65 parts per million was employed and in the other emulsion, water having a hardness of 342 parts per million was employed.

The resulting emulsions were of high quality and possessed a high degree of stability.

*Example 3*

The procedure of Example 2 was repeated with the exception that the emulsifier employed was prepared by reacting dinonylphenol with 10 mols of ethylene oxide to obtain a surface active agent and then reacting 2.7 mols of the surface active agent with 1 mol of phosphorus pentoxide.

When emulsions were prepared in an analogous manner to those of Example 2, excellent results were also obtained.

*Example 4*

The procedure of Example 1 was repeated with the exception that the barium salt of the phosphate ester was employed instead of the free acid form. Emulsions prepared from this emulsificable composition also had excellent properties.

*Example 5*

A emulsifiable composition was prepared by combining:

63 parts of 2,4-D butoxyethyl ester,
32 parts of aromatic solvent, and
5 parts of the barium salt of a phosphate ester prepared by reacting 9 mols of ethylene oxide with nonylphenol and then reacting 2.7 mols of the reaction product with 1 mol of phosphorus pentoxide.

The above composition was employed to formulate a 10 percent by weight aqueous emulsion having excellent stability.

*Example 6*

An emulsifiable composition was prepared by combining:

61 parts of toxaphene,
36 parts of kerosene, and
3 parts of the phosphate ester employed in Example 1.

When 10 parts of the above composition were dispersed in 90 parts by weight of either hard or soft water, excellent results were obtained.

*Example 7*

The procedure of Example 5 was repeated with the exception that the emulsifier was the tertiary butyl amine salt of a phosphate ester prepared by reacting 9 mols of ethylene oxide with 1 mol of nonylphenol to form a surface active agent with 1 mol of phosphorus pentoxide.

A good useable emulsion was formed in both 65 and 342 p.p.m. water illustrating the utility of the phosphate ester in the form of its organic amine salt.

*Example 8*

An emulsifiable composition was prepared by combining:

19 parts of dieldrin,
78 parts of aromatic solvent, and
3 parts of a phosphate ester prepared by reacting 15 mols of ethylene oxide with dinonylphenol to produce a surface active agent and then reacting 2.7 mols of said surface active agent with 1 mol of phosphorus pentoxide.

A good useable emulsion was formed in both 65 and 342 p.p.m. water illustrating the utility of the dinonylphenol based phosphate ester in emulsifying a composition containing dieldrin.

*Example 9*

An emulsifiable composition was prepared by combining:

23.72 percent by weight of DDT,
49.55 percent by weight of a high solvency aromatic hydrocarbon (Panasol AN–2K sold by the Amoco Chemical Corp.),
23.73 percent by weight of a petroleum aromatic (aromine 85 sold by Esso Standard Oil Co.),
1.8 percent by weight of a phosphate ester prepared by reacting 6 mols of ethylene oxide and 1 mol of phenol and then reacting 2.7 mols of the reaction product with 1 mol of phosphorus pentoxide,
1.2 percent by weight of a phosphate ester prepared by reacting 15 mols of ethylene oxide with 1 mol of dinonylphenol and then reacting 2.7 mols of the reaction product with 1 mol of phosphorus pentoxide.

The above emulsifiable composition was used to prepare 2.5 percent emulsions in 50, 300 and 600 parts per million water. All three emulsions formed were of excellent quality illustrating the effectiveness of a blend of phosphate esters.

Various modifications of the invention will occur to persons skilled in the art. Thus, it is evident that in lieu of using the compounds of the examples, any of the compounds mentioned above can be employed with similar results. Therefore, it is not intended that the invention be limited in the patent granted except as necessitated by the appended claims.

What is claimed is:

1. An emulsifiable composition, adapted to be employed as an agricultural spray consisting of from 10–70 weight percent of a biocide, from 28–88 weight percent of an organic solvent therefor and from 2–6 weight percent of a phosphate ester prepared by reacting 1 mole of $P_2O_5$ with 2 to 4.5 moles of a nonionic surface active agent having the molecular configuration of a condensation product of at least one mole of ethylene oxide with one mole of an alkyl phenolic compound under substantially anhydrous conditions and at a temperature below about 110° C.

2. The composition of claim 1 dispersed in water.

3. An emulsifiable composition adapted to be employed as an agricultural spray consisting of from 10–70 weight percent of a biocide, from 28–88 weight percent of an organic solvent therefor and from 2–6 weight percent of a phosphate ester prepared by reacting 1 mole of $P_2O_5$ with 2 to 4.5 moles of a nonionic surface active agent having the molecular configuration of a condensation product of at least one mole of ethylene oxide with one mole of nonylphenol.

4. An emulsifiable composition adapted to be employed as an agricultural spray consisting of from 10–70 weight percent of 2,2-bis(parachlorophenyl)-1,1,1-trichloroethane, from 28–88 weight percent of an aromatic hydrocarbon solvent therefor and from 2–6 weight percent of a phosphate ester prepared by reacting nonylphenol with 6 moles of ethylene oxide to obtain a surface active agent and then reacting 2.7 moles of said surface active agent with 1 mole of phosphorus pentoxide.

5. The composition of claim 4 dispersed in water.

6. An emulsifiable composition adapted to be employed as an agricultural spray consisting of from 10–70 weight percent of 1,2,4,5,6,7,8,8-octachloro-4,7-methano-3a,4,7,7a-tetrahydroindane, from 28–88 weight percent of kerosene and from 2–6 weight percent of a phosphate ester prepared by reacting nonylphenol with 6 moles of ethylene oxide to obtain a surface active agent and then reacting 2.7 moles of said surface active agent with 1 mole of phosphorus pentoxide.

7. The composition of claim 6 dispersed in water.

8. An emulsifiable composition adapted to be employed as an agricultural spray consisting of from 10–70 weight percent of the butoxyethyl ester of 2,4-dichlorophenoxy-acetic acid, from 28–88 weight percent of an aromatic solvent and from 2–6 weight percent of a phosphate ester prepared by reacting 9 moles of ethylene oxide with nonylphenol and then reacting 2.7 moles of the reaction product with 1 mole of phosphorus pentoxide.

9. The composition of claim 8 dispersed in water.

10. An emulsifiable composition adapted to be employed as an agricultural spray consisting of from 10–70 weight percent of chlorinated camphene, from 28–88 weight percent of kerosene and from 2–6 weight percent of a phosphate ester prepared by reacting nonylphenol with 6 moles of ethylene oxide to obtain a surface active agent and then reacting 2.7 moles of said surface active agent with 1 mole of phosphorus pentoxide.

11. The composition of claim 10 dispersed in water.

12. An emulsifiable composition adapted to be employed as an agricultural spray consisting of from 10–70 weight percent of 1,2,3,4,10,10-hexachloro-6,7-epoxy-1,4,4a,5,6,7,8,8a-octahydro - 1,4,5,8 - dimethanonaphthalene, from 28–88 weight percent of an aromatic solvent and from 2–6 weight percent of a phosphate ester prepared by reacting 15 moles of ethylene oxide with dinonylphenol to produce a surface active agent and then reacting 2.7 moles of said surface active agent with 1 mole of phosphorus pentoxide.

13. The composition of claim 12 dispersed in water.

References Cited by the Examiner
UNITED STATES PATENTS

| | | |
|---|---|---|
| 2,845,380 | 7/1958 | Mayhew et al. _____ 167—42 |
| 3,004,056 | 10/1961 | Nunn et al. |
| 3,004,057 | 10/1961 | Nunn et al. |

LEWIS GOTTS, *Primary Examiner.*

JULIAN S. LEVITT, *Examiner.*